United States Patent
Widowitz et al.

[15] 3,660,882
[45] May 9, 1972

[54] PROCESS FOR THE PRODUCTION OF TURBINE BLADES

[72] Inventors: Herbert Widowitz, Kapfenberg; Manfred Hammer, Bruck S.D. Mur, both of Austria

[73] Assignee: Gebr. Bohler & Co. Aktiengesellschaft, Kapfenberg, Austria

[22] Filed: Apr. 27, 1970

[21] Appl. No.: 32,037

[30] Foreign Application Priority Data

Apr. 28, 1969 Austria....................................4074/69

[52] U.S. Cl...................29/156.8 B, 29/156.8 P, 29/480, 29/DIG. 18, 416/224
[51] Int. Cl...................B21k 3/04, B23p 15/02, B23p 15/00
[58] Field of Search..............29/156.8 B, 156.8 P, DIG. 18, 29/480; 416/224, 241; 415/215

[56] References Cited

UNITED STATES PATENTS

| | | | |
|---|---|---|---|
| 3,215,511 | 11/1965 | Chisholm et al. | 416/224 X |
| 3,275,295 | 9/1966 | Caldwell et al. | 416/224 |
| 3,564,689 | 2/1971 | Hirtenlechner | 29/156.8 B |
| 3,466,725 | 9/1969 | Kock | 29/156.8 R |
| 2,450,440 | 10/1948 | Mills | 29/156.8 P X |

Primary Examiner—John F. Campbell
Assistant Examiner—Donald C. Reiley, III
Attorney—Holman and Stern

[57] ABSTRACT

A turbine blade blank is roughly formed having a recess extending along at least a portion of the leading edge, and a hard alloy leading edge insert is also roughly formed to be commensurate in shape to the recess. The insert is then welded to the blade blank, the composite blade is then forged into final shape and heat treated.

4 Claims, 3 Drawing Figures

PATENTED MAY 9 1972 3,660,882

Inventors
HERBERT WIDOWITZ
MANFRED HAMMER
Holman, Glascock, Downing & Seebold
ATTORNEYS

PROCESS FOR THE PRODUCTION OF TURBINE BLADES

The present invention relates to a process for the production of turbine blades, particularly for the low pressure stage of steam turbines.

Such turbine blades are usually produced of the known corrosion resistant 13 percent Cr-steels, austenitic Cr-Ni-steels or precipitation hardenable Cr-Ni-steels. The edges of the turbine blades are exposed to particularly heavy corrosion because there is wet steam in the low pressure stages of the steam turbines and because the flow velocities are particularly high.

Therefore, many ways have been tried to protect the edges of the turbine blades, especially against erosion. For example, the exposed edges have been given a higher strength by surface hardening. This method has the disadvantage that the turbine blades have to be made of Cr-steels with a higher carbon content, which are less resistant to corrosion when they are tempered in the region between 500° and 650° C. Welding on strips of hard metal, or edges of cemented carbide, as erosion protection is known, but this produces blades with a weld joint, which produces a pronounced point of weakness. Armoring the edges of turbine blades by build-up welding has also been tried. Thereby the intermediate zone between the welded on material and the base metal has the disadvantage of its lower strength.

To avoid these disadvantages it has been privately suggested to build up the hard alloy at an intermediate stage before forging to final dimensions rather than building up the hard alloy on the finished blade. The disadvantages of this method are cracksensitivity, heavy warping and the fact, that with thin blade profiles, the recesses needed for the weld deposit amount, at the edges, practically to the whole thickness of the blades. Therefore there is not enough base-metal at the areas to be armored, so that the method cannot be applied to thin blade profiles.

The object of the invention is to avoid the disadvantages of the known methods and to produce turbine blades with leading edges protected against erosion.

According to the invention the erosion problem is solved by producing a turbine blade blank in the customary way and welding on a preformed erosion protection edge of hard alloy. The so formed composite blank is finished by die forging, and finally subjected to a heat treatment.

The turbine blade blank is usually produced by die forging; particularly with strongly contoured profiles the erosion protection edge also is preferably preformed by die forging, so that after it is welded to the blade blank, the profile of the composite is suitable for the final forging. Presuming a composition of suitable hard alloys, it is also possible and practical to use erosion protection edges produced by casting or sintering.

The term "hard alloy", as used in this disclosure to refer to a material for the erosion protection edge, is meant to include all the forgeable alloys and metals, which under service conditions have a considerably higher hardness and corrosion resistance than the base metal of the blade.

Preferably chrome-cobalt- tungsten -alloys are used, which are known under the terms "Stellite" and "Celsite." But also other hard alloys such as high speed steel, plain carbon steel and sintered materials, for example, cemented carbides with a high portion of titanium carbide in a matrix of an iron alloy, are also possible.

The recess for erosion protection edge is usually only at the outer region of the turbine blade which recess may be provided during the forging of the blade blank, or of course the recess may also be formed by machining or by some other method.

The joint welding is carried out in the usual way, particularly with a preheating of the parts to be welded and by laying an X-seam in cross section (FIG. 2). It has been proved particularly suitable to perform the joint-welding with electrodes which form as a weld an austenitic precipitation hardenable alloy, preferably of a composition of 0.06%–0.12% C, 18 – 22 % Cr, 8 – 12 % Ni, 14 – 18 % W, the remainder Co and unavoidable impurities.

A preferred embodiment of the invention is described more particularly in the drawing in which.

Figures 1, 2, 3:
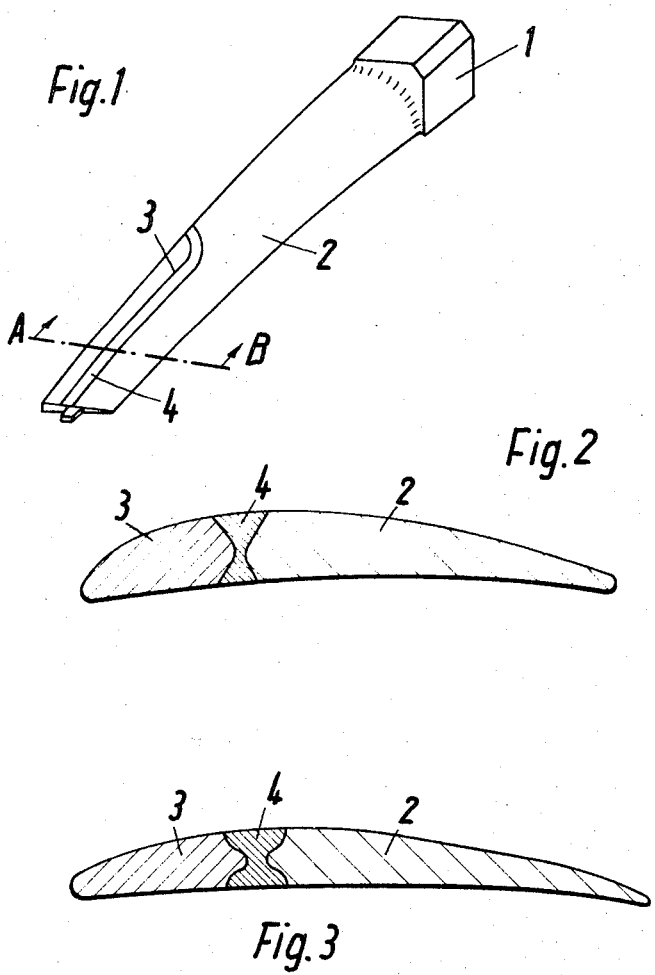
FIG. 1 shows a turbine blade with a welded on erosion protection edge.
FIG. 2 shows the cross section of the outer part of the turbine blades along the line A–B seen in FIG. 1.
FIG. 3 shows the same cross section after final forging.

At first a blade blank is die forged, for example, of X 15 Cr 13 material (0.15% C, 13% Cr.). According to FIG. 1 this blank consists of a root 1 and the blade 2. The dimensions of this blank are somewhat larger than the desired final measurements, and a recess for the erosion protection edge 3 is provided. An erosion protection edge of a known hard alloy with approximately 1.2 % C, 25 % Cr, 5 % W, the remainder substantially Co, preformed by forging and die forging, is placed into the recess and joined to the turbine blade 2 by joint welding. The welding is carried out by means of arc welding and the use of a filler metal which gives a weld having a composition of approximately 0.1 % C, 20 % Cr, 10 % Ni, 15 % W and 50 % Co and produces a weld particularly free of cracks. For the welding operation, the parts are preheated to approximately 600° C. At first one side of the X-seam is welded and before the other side is welded, the root of the weld is ground out in order to obtain a perfect through weld.

After stress relieving of the so-formed composite blank at approximately 750° C and smoothing the welding seam, the final die forging is carried out at approximately 1,100° C. The final heat treatment in the present case consists of quenching from 950° C and tempering at 680° C for 5 hours. Thereby the welded zone 4 of the finished blade obtains a hardness which lies between the hardness of the erosion protection edge 3 and the hardness of the turbine blade 2.

The particular advantages obtained by the invention are, that by comparatively simple means it is possible to produce turbine blades which satisfy the modern demands in an ideal way.

The preforged erosion protection edge of hard metal has a considerably higher strength than a hard facing built up by welding with the same alloy. The final forging raises the strength of the edge and furthermore improves the microstructure of the intermediate zone between the weld and the base metal. A further improvement is obtained by the final heat treatment.

The invention is not restricted to the given example. For one skilled in the art it is clear, that, when the blade is made of precipitation hardening alloys, the temperature of the heat treatment can easily be adjusted to suit the precipitation hardening temperature.

Thereby it is all the same, if in all zones, that is the erosion protection edge, the weld and the base metal, a precipitation hardening occurs, or only in one or two of these zones.

Although the invention has been described and illustrated in detail, it is to be understood that this does not delimit the invention. The spirit and scope of this invention is limited only by the language of the appended claims.

We claim:

1. A method of producing turbine blades comprising the steps of preforming a steel blade blank having a recess along at least a portion of the leading edge thereof; preforming a hard alloy leading edge insert which is roughly commensurate with said recess; welding said insert to said blade blank; forging said blade blank and welded insert into a smooth turbine blade configuration of final shape; and then heat treating.

2. The method as claimed in claim 1 wherein said welding is carried out with electrodes which give as a weld an austenitic precipitation hardenable alloy of an composition 0.06 – 0.12 % C, 18 – 22 % Cr, 8 – 12 % Ni, 14 – 18 % W, remainder Co and unavoidable impurities.

3. The method as claimed in claim 2 wherein said blade blank is a steel alloy having 0.15 % C and 13 % Cr.

4. The method as claimed in claim 1 wherein said weld in cross section is in the form of an "X."

* * * * *